Aug. 15, 1944.　　　　R. D. HICKOK　　　　2,355,649
ELECTRIC METER
Filed April 21, 1943　　　3 Sheets-Sheet 1
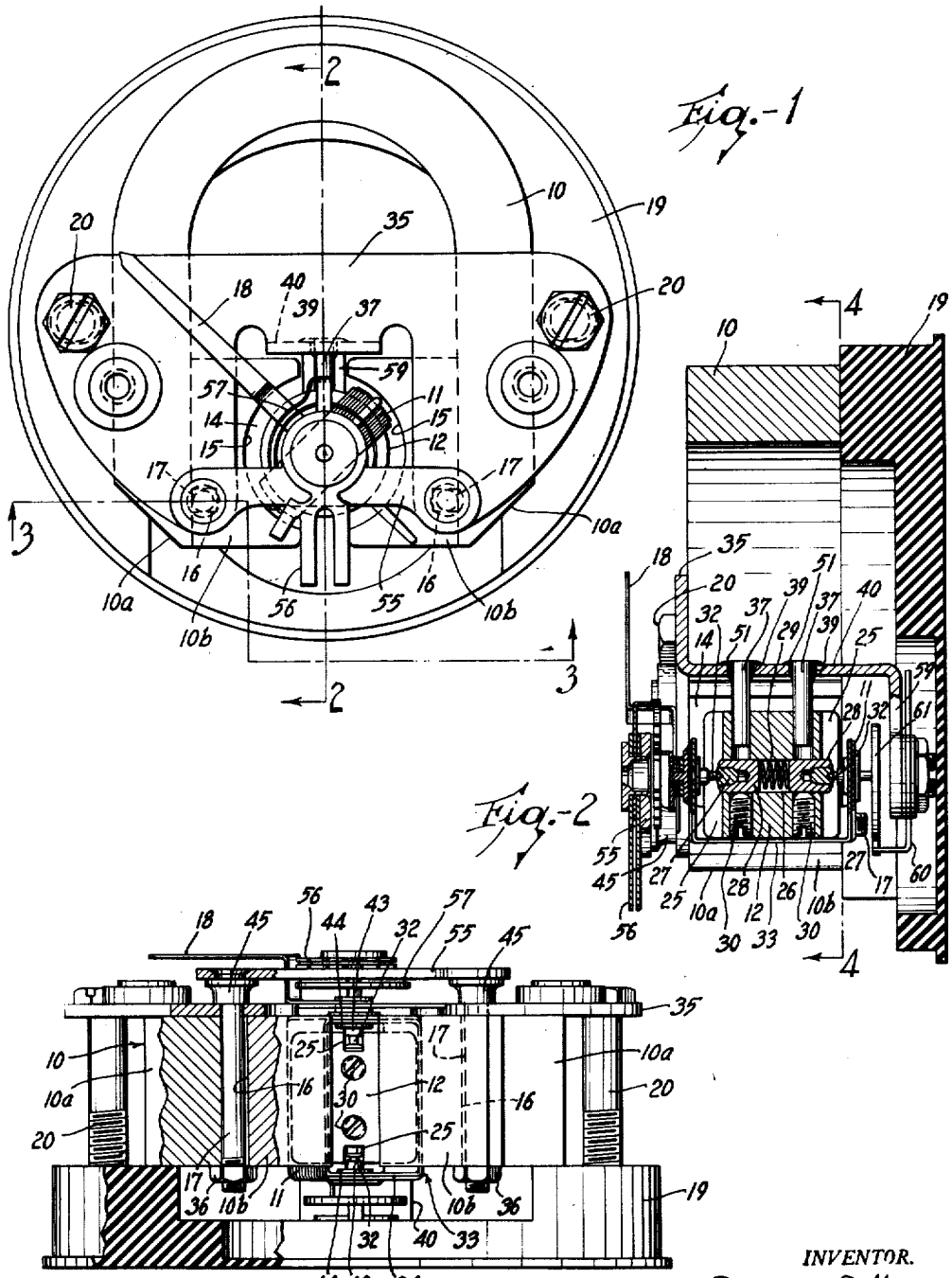
INVENTOR.
ROBERT D. HICKOK
BY Hyde and Meyer
ATTORNEYS.

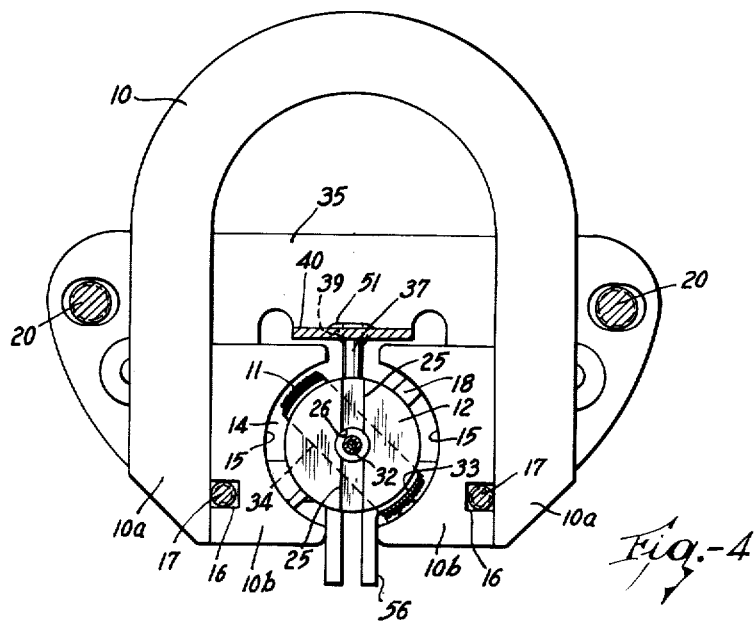
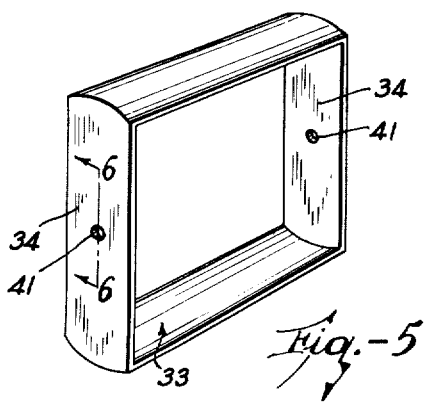
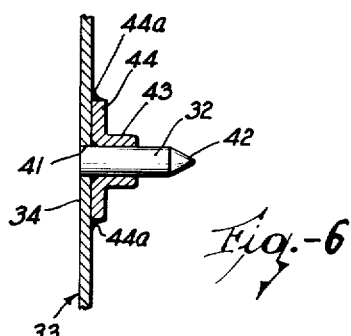
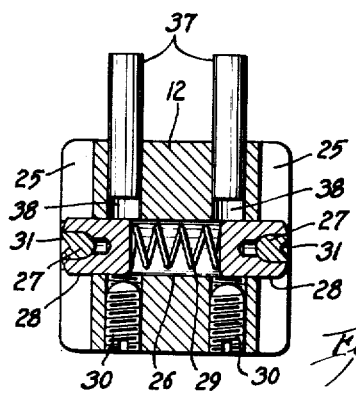
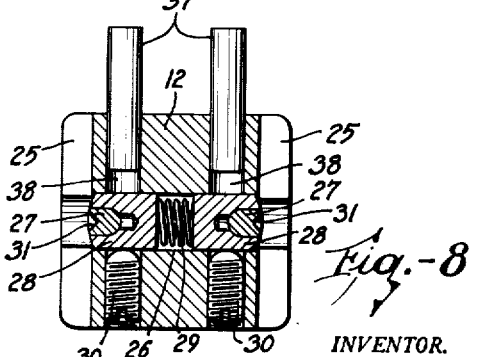
INVENTOR.
ROBERT D. HICKOK.
BY
Hyde and Meyer
ATTORNEYS Aug. 15, 1944.　　　　R. D. HICKOK　　　　2,355,649
ELECTRIC METER
Filed April 21, 1943　　　3 Sheets-Sheet 3
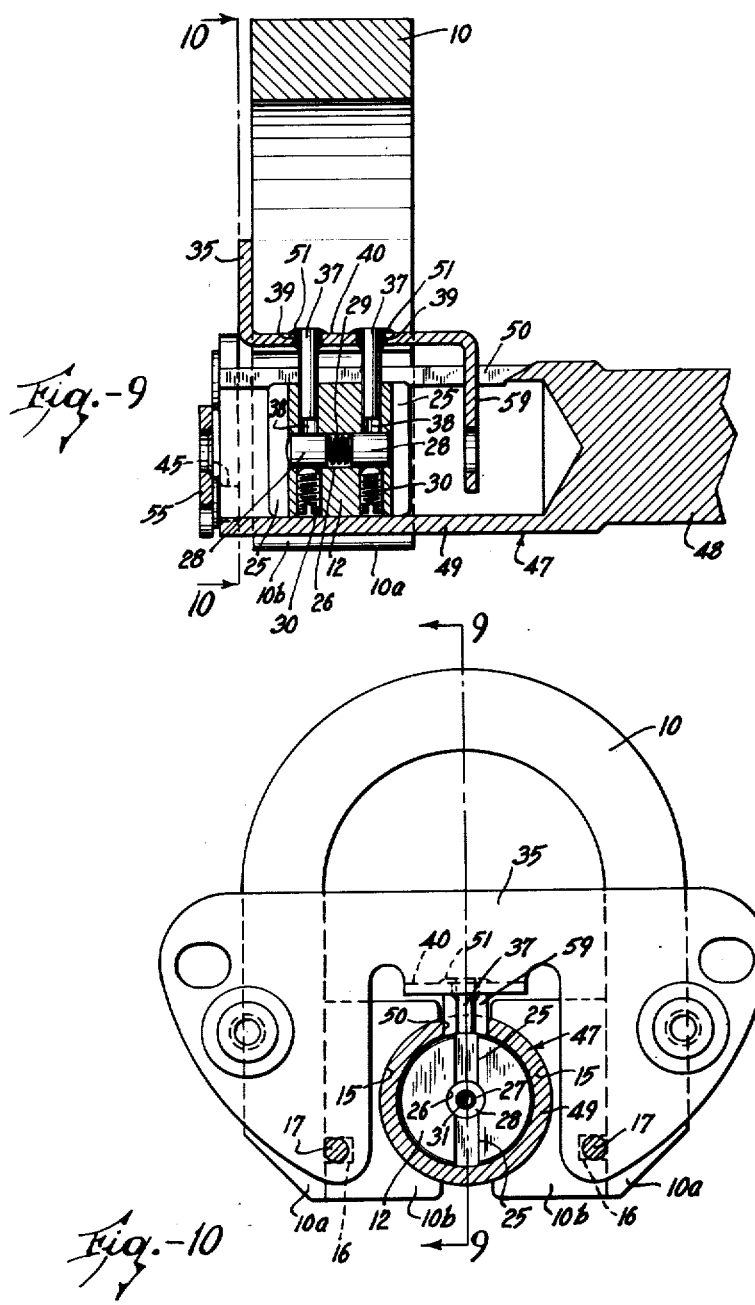
INVENTOR.
ROBERT D. HICKOK
BY Hyde and Meyer
ATTORNEYS Patented Aug. 15, 1944

2,355,649

UNITED STATES PATENT OFFICE 2,355,649

ELECTRIC METER

Robert D. Hickok, Bratenahl, Ohio, assignor to Cleveland Patents, Incorporated, Cleveland, Ohio, a corporation of Ohio Application April 21, 1943, Serial No. 483,925

11 Claims. (Cl. 171—95)

This invention relates to electric meters and more particularly to D'Arsonval meter movements of the internal pivot type.

One object of the invention is to secure not only all the inherent advantages of internal pivot type movements but also to so simplify and improve the construction as to secure increased final accuracy of the movement as a whole and permit the use of more rapid and convenient methods of manufacture and assembly, with accompanying reduction in cost.

Another object is to provide an improved mounting and construction for the jewels which support the moving coil, which permits convenient assembly without harm to the pivots or jewels and which insures all necessary freedom of coil movement without excess play or looseness in the parts.

Another object is to improve the manner of mounting the pivots in the moving coil frame, to insure accuracy and maintain them in their proper positions with appropriate alinement, and which also permits ready replacement of a worn pivot with the same degree of accuracy in position and alinement as in a new instrument.

Still another object is to improve the manner of connecting the permanent magnet and the core around which the moving coil turns, to insure and maintain concentricity thereof by simple expedients.

Still another object is to improve the manner of mounting the bridge carrying the regulator to which the upper hair spring is soldered, to insure its position with relation to the magnet poles, the core, and the moving coil.

Further objects of the invention are in part obvious and in part will appear more in detail hereinafter.

In the drawings, which represent one suitable embodiment of the invention;

Fig. 1 is a top plan view, the usual enclosing casing and scale plate being omitted for simplicity of illustration;

Fig. 2 is a detail vertical sectional view on the line 2—2 of Fig. 1;

Fig. 3 is a view, partly in end elevation and partly in section, taken on the line 3—3 of Fig. 1;

Fig. 4 is a horizontal sectional view taken on the line 4—4 of Fig. 2;

Fig. 5 is a perspective view of the frame for the movable coil;

Fig. 6 is a sectional view, somewhat enlarged, taken on the line 6—6 of Fig. 5, but showing, in addition, a pivot assembly in position on the coil frame;

Figs. 7 and 8 are detail sectional views, showing the position of the parts in preliminary stages in the assembly of the movable coil on the core;

Fig. 9 is a sectional view, taken on the line 9—9 of Fig. 10 showing a preliminary step in the alignment of the core with respect to the pole pieces; and Fig. 10 is a sectional view taken on the line 10—10 of Fig. 9.

The meter movement shown for purposes of illustration is of the D'Arsonval type. It comprises three essential elements, to-wit, a permanent magnet 10, a moving coil 11, and a core 12 located between the magnet poles and around which the coil turns in the gap between the core and magnet poles.

Magnet 10 may be of any suitable form, but is shown as including a U-shaped body part having its legs 10a provided with pole pieces 10b extending inwardly toward each other and bored and accurately reamed to provide a generally cylindrical chamber 14 bounded by the semi-cylindrical faces 15 of the pole pieces. Rectangular holes 16 are provided in the pole pieces to receive mounting posts 17 (Fig. 4). In quantity production the pole pieces are formed separately from the U-shaped body; the holes are slotted out as grooves; and then the pole pieces are welded to the body. After boring and reaming the final assembly is magnetized in the usual manner.

All the parts of the movement including those above referred to, as well as the indicating pointer 18, and the hair spring assemblies to be referred to, are attached to and carried by the magnet, and hence are capable of manufacture and assembly on the bench as a unit, to be mounted in any suitable casing or support 19, such as by bolts 20 (Figs. 1 and 3). The scale plate (not shown) is usually applied last, being fastened in place by bolts.

This meter is of the internal pivot variety in the sense that the moving coil is pivoted to the core instead of to bridge members mounted on the frame.

The core 12 is accurately turned to generally cylindrical form, the ends having diametrical slots 25 communicating with the ends of an axial bore or opening 26 in which are mounted the jewels 27 (Figs. 2, 7 and 8). Each of these is secured by spinning in a cylindrical plug 28 sliding in said bore, the two plugs being urged apart by a light compression spring 29 between them, and each being capable of being locked, by a set screw 30, in any position to which it may be adjusted in the bore. The socket or recess 31 in each jewel is adapted to receive the pointed end of one of the pivot pins 32 carried by the moving coil and described more in detail hereinafter.

In all instruments of this type it is important that the mechanical means of supporting or holding the core or center member, embraced by the moving coil, should hold it firmly in the exact center of the space between the pole pieces. In other words, when the annular space between the opposed pole pieces and the core is bounded by surfaces which are both cylindrical, such surfaces should be truly coaxial, with the moving coil symmetrical and coaxial with respect to the core, so that in any angular position the relation between core, moving coil and pole is the same. This result is secured in the present movement in the following manner and by means now to be described. This method is effected before assembly of the movable coil on the core. The core supporting frame 35 is attached to the magnet by the insertion of posts 17 through holes 16, and clamping nuts 36 are applied to the threaded ends of the posts to effect a temporary assembly pending accurate centering of the core and final attachment of the core to the frame as will now be described (Figs. 9 and 10).

The core is equipped with a suitable projection or projections, such as two pins 37, which are a driving fit in radial core openings 38, and which projections extend outwardly from the core, when driven into their final positions, sufficiently to enter openings 39 in a wall 40 of the sheet brass frame member 35. This frame member is held beneath the heads 45 of posts 17 to the lower end of which are attached the clamping nuts 36 (Fig. 3).

The holes 39 through which the ends of the two pins 37 extend are purposely made slightly larger than the pins (Figs. 9 and 10), say by .002 inch or so. In other words, the holes are oversize and the pins are a sloppy fit. Thus, with the pins loose in the holes and the frame 35 rigidly attached to the magnet, the core is capable of some adjustment both radially and askew with respect to the central axis of the cavity between the pole pieces of the magnet.

True concentric relation between the pole pieces and the core is obtained by the use of a suitable locator or jig, shown at 47. The jig shown consists of a metal bar having a solid handle portion 48 and a sleeve like end portion 49 provided at one side with a longitudinal slot 50. The sleeve portion of the jig has exactly the same external diameter as the internal diameter of the cylindrical cavity 14 between the pole pieces, while the internal diameter of said sleeve is exactly the same as the external diameter of the core 12, in both cases with only sufficient clearance for a close sliding fit. Of course the internal and external sleeve surfaces are truly concentric. With the core in place and with the ends of the pins 37 extending into the openings 39, the jig is inserted into position between the core and pole pieces, the pins entering the slot 50 as the jig is inserted. When the jig reaches its final position, shown in Fig. 9, the core has been accurately located and is exactly coaxial with respect to the cylindrical space between the pole pieces. While the core is held in this position it is permanently secured to the frame in any suitable manner. For example, and as shown, some suitable self-hardening material, such as solder, is applied between the frame and the ends of the pins where they project slightly through the supporting wall 40, as at 51 (Fig. 9), to secure them permanently to the frame, thus anchoring them in truly central position. This obviates any possible inaccuracies either in the position of the pins or holes or in the length of the pins, and makes it unnecessary that the frame be bent precisely at right angles. Under practically all conditions of manufacture true coaxial relation is thus established and maintained between the core and the cylindrical space between the pole pieces.

After assembly in the manner described the jig is withdrawn in reverse direction to that of its insertion. The nuts 36 are then removed and the core supporting frame 35 (including the mounting posts 17 and the upper bridge 55) is removed to facilitate assembly of the coil around the core, as previously described. After such assembly the posts 17 are again inserted through the slots 16 and the nuts 36 are applied to the threaded ends of the posts and turned up to final position.

One great difficulty encountered in meters of this type has been that of accurately locating the coil pivots with their associated mountings so that the pivots are symmetrically in the central axis of the moving coil frame. The moving coil consists of a generally rectangular frame 33 (Figs. 5 and 6), made of aluminum or other non-magnetic material, on which the wire coil is wound, the end plates 34 of said frame being the ones to which the pivots are attached. Each end plate may be accurately pierced with a central hole 41. Each pivot pin 32 includes a hardened steel body having a pointed end 42 adapted to engage the jewel, the cylindrical shank of the pin being a driving fit in a sleeve holder 43 having a flange-like base 44. The pin is driven into the sleeve holder until its cylindrical blunt end projects beyond the same, a distance slightly greater than the thickness of the frame plate 34. In that position the pivot is attached to the frame by cement applied at 44a between the base flange 44 and the end plate 34, such as shellac or any substance capable of being softened either by heat or by the use of a solvent. In this way it is possible readily to attach to the moving coil frame two hardened steel pivots which are central and truly symmetrical with reference to the coil and which are accurately alined with each other, so that when assembled with the jewels the coil will be truly symmetrical and coaxial with respect to the core.

Furthermore, in instruments of this kind it is usually the hardened steel points that suffer the most wear in use. Wear here tends to loosen rather than tighten the moving coil. But whenever a pivot pin shows signs of wear it is possible by softening the cement, either with heat or with a solvent, to remove the pivot from the coil and replace it with a new one, with the certainty that the new pivot will be absolutely coaxial and symmetrical with respect to the core, just as in a new instrument.

The arrangement already described not only simplifies the pivot construction but enables the moving coil to be assembled in its position embracing the core, with the pivots in the jewel mounts, without injury to the pivots or jewels, and with certainty of securing exactly the very small amount of lost motion required to avoid damaging the delicate points and, when in use, to insure free movement without friction. The jewels, spun into their respective plugs, with the compression spring between them, and with their binding screws loose (Fig. 7), are assembled in the core, and the jewel mounts are then pressed inwardly so as to be wholly within the core (Fig. 8). While in this position the set screws are tightened. The moving coil with its associated pivots and hair spring mounts is then moved into position embracing the core, the pivots 32 moving through the diametrical slots 25. In this way, each pivot may be introduced into its respective jewel and the coil will hang upon such pivot coaxial with the core. The operator now loosens one of the binding screws 30, whereupon spring 29 immediately expands and forces out the loosened plug and jewel. Then the other binding screw is loosened, and the remaining plug and jewel spring outwardly by further expansion of spring 29. Both jewels thus are adjusted to engage the pivots but without injury thereto or to the jewels because of the very light compression of spring 29. The coil is now actually pivotally connected to the core and is truly coaxially related thereto. Both jewel plugs are loose in the bore, and the entire coil now is moved bodily axially either upwardly or downwardly, carrying the plugs with it to such a position as to center the coil with respect to the core, axially thereof. In this position both binding screws are tightened on the jewel holding plugs. The operating position of the coil with respect to the core is shown in sectional view in Fig. 2.

The procedure described results in locking the jewel mounts in proper position with respect to the pivots. Experience shows that such assembling practice produces exactly the right pressure of the pivots on the jewels with just the right amount of clearance or play so that the coil turns freely without either friction or lost motion capable of detection.

To disassemble the parts, one of the binding screws is loosened sufficiently to allow its jewel mount to be pressed inwardly out of engagement with its pivot. Then the other jewel mount is loosened and pressed inwardly in the same manner, which allows the coil to be taken off by reverse movement to that of assembly.

The mounting posts 17 before referred to not only serve for attachment of the frame to the permanent magnet, but also to support the upper bridge 55 carrying the adjustable member 56 to which the upper hair spring 57 is soldered. This adjustable member serves for setting the pointer 18 to zero position. The bridge, which is nonmagnetic, has its opposite ends provided with openings to receive end portions of said mounting posts adapted either to receive securing nuts or to be spun over, as shown, for securement of the bridge thereto.

The pointer 18, of course, is carried by the moving coil frame at one end of the core, and at the opposite end of the core an arm extension 58 of the frame carries a member 60, to which the lower hair spring 61 is soldered.

What I claim is:

1. A meter movement of the character described, comprising a magnet, a cylindrical core, and a coil member, the magnet being of U form with opposed pole pieces, the coil member embracing and turning around the core in the air gap between the core and the pole pieces, supporting means connecting the core and magnet, the coil member having inner alined pivots extending toward each other, and two jewel mounts mounted in the ends of the core and presenting sockets outwardly to receive the pivots, at least one of said jewel mounts being adjustable outwardly from the core to engage its pivot, and adjusting means for the adjustable jewel mount.

2. A meter movement of the character described, comprising a magnet, a core, and a coil member, the magnet being of U form with opposed pole pieces, the coil member embracing and turning around the core in the air gap between the core and the pole pieces, supporting means connecting the core and magnet, the coil member having inner alined pivots extending toward each other, said core having a bore, two plugs each carrying a jewel mount presenting a socket outwardly to receive one of said pivots, the two plugs being mounted end to end in said bore, and yielding means between said plugs tending to move them outwardly.

3. A meter movement of the character described, comprising a magnet, a core, and a coil member, the magnet being of U form with opposed pole pieces, the coil member embracing and turning around the core in the air gap between the core and the pole pieces, supporting means connecting the core and magnet, the coil member having inner alined pivots extending toward each other, said core having a bore, two plugs each carrying a jewel mount presenting a socket outwardly to receive one of said pivots, the two plugs being mounted end to end in said bore, yielding means between said plugs tending to move them outwardly, and means for locking each plug against movement in said bore.

4. A coil member for a meter of the character described, comprising a closed generally rectangular frame having wire turns wound upon it in coil form, said frame having end plates each provided with a central opening, and a pivot member for each end plate, comprising a shank having blunt and pointed end portions, a collar on the shank spaced from its blunt end, said pivot being mounted upon an end plate with its collar presented to a surface of said plate and its blunt end entering said opening, and cement material securing said pivot and end plate together.

5. A meter movement of the character described, comprising a generally U shaped magnet having opposed pole members, a frame, bolts securing the frame to the magnet, a core supported upon said frame and lying between the pole members, a coil member rotating about said core in the air gap between the core and magnet poles, pivotal connections between the core and the coil member, said bolts having end extensions, a bridge connecting and supported by said extensions, and a hair spring extending from the coil to the bridge at one end of the core.

6. A meter movement of the character described, comprising a generally U shaped magnet having opposed pole members, a frame, bolts securing the frame to the magnet, a core supported upon said frame and lying between the pole members, a coil member rotating about said core in the air gap between the core and magnet poles, pivotal connections between the core and the coil member, said bolts having end extensions, a bridge connecting and supported by said extensions, and a hair spring extending from the coil to the bridge at one end of the core, said frame having an arm opposite the other end of the core, and a second hair spring extending from the coil to said arm.

7. In a meter movement of the character described, a magnet of generally U-form having opposed pole members shaped to form jointly a generally cylindrical cavity, a frame rigidly secured to the magnet and having an arm extending alongside said cavity, a generally cylindrical core within said cavity, provided with a projection extending outwardly from said cavity into close proximity with said frame arm, and means for permanently securing said pin to said frame when the core has been accurately centered in the cavity.

8. In a meter movement of the character described, a magnet of generally U-form having opposed pole members shaped to form jointly a generally cylindrical cavity, a frame rigidly secured to the magnet and having an arm extending alongside said cavity, a generally cylindrical core within said cavity, provided with a projection extending outwardly from said cavity into close proximity with said frame arm, and self hardening means for permanently securing said pin to said frame when the core has been accurately centered in the cavity.

9. The method of securing together in accurate coaxial spaced relation a generally cylindrical meter core having an outwardly extending projection and a meter magnet having a generally cylindrical cavity between its pole pieces of greater internal diameter than the external diameter of said core and also having a frame provided with an arm which lies adjacent said projection when the parts are assembled, consisting in placing the core in the cavity in generally central position with its projection adjacent said arm, inserting into the annular gap between the core and the pole pieces a generally sleeve form jig closely fitting both thereof and thereby adapted to accurately relatively locate them in coaxial relation, permanently securing the adjacent projection and frame arm to each other, and removing said jig.

10. The method of permanently securing together in accurate coaxial spaced relation a generally cylindrical meter core and a meter magnet having a generally cylindrical cavity between its pole pieces of greater internal diameter than the external diameter of the core, consisting in placing the core in the cavity in generally central position, inserting into the annular gap between the core and the pole pieces a temporary removable locator of form adapted to engage both the wall of the cavity and the core and thereby accurately locate them in coaxial relation, then while the parts are held in such relation permanently attaching the core to the permanent magnet, and removing the locator.

11. The method of permanently securing together in accurate coaxial spaced relation a generally cylindrical meter core and a meter magnet having a generally cylindrical cavity between its pole pieces of greater internal diameter than the external diameter of the core and in which the magnet is provided with a rigid frame having an arm provided with openings and the core is provided with outwardly projecting rigid pins which are slightly smaller than said openings, consisting in placing the core in the cavity in generally central position with said pins entering said openings, inserting into the air gap between the core and magnet pole pieces a removable jig of sleeve form adapted to engage both the core and the cavity walls and accurately locate them in coaxial relation, then while held in such relation applying self hardening attaching material between the pins and the frame arm to permanently secure them together, and removing the jig.

ROBERT D. HICKOK.